(12) United States Patent
Harris

(10) Patent No.: US 6,298,891 B1
(45) Date of Patent: Oct. 9, 2001

(54) NON-PNEUMATIC TIRE WITH DOUBLE NOTCHED RIM

(75) Inventor: Darryl Harris, North Canton, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/202,465

(22) PCT Filed: Sep. 5, 1996

(86) PCT No.: PCT/US96/14259

§ 371 Date: Dec. 10, 1998

§ 102(e) Date: Dec. 10, 1998

(87) PCT Pub. No.: WO98/09830

PCT Pub. Date: Mar. 12, 1998

(51) Int. Cl.[7] .............................. B60B 21/10; B60C 15/02
(52) U.S. Cl. ........................ 152/382; 152/323; 152/396
(58) Field of Search ........................ 152/5, 7, 49, 50, 152/246, 247, 248, 323, 327, 329, 393, 394, 395, 396, 397, 398, 382 I, 409, 410

(56) References Cited

U.S. PATENT DOCUMENTS

| | | |
|---|---|---|
| 612,583 | 10/1898 | Davidson . |
| 826,144 | 7/1906 | Cole . |
| 1,186,472 | 6/1916 | Estes . |
| 1,233,462 * | 7/1917 | Frommann ............................. 152/50 |
| 1,242,640 | 10/1917 | Buttershall . |
| 1,336,452 | 4/1920 | Wheelock . |
| 1,462,891 * | 7/1923 | Vinnedge ............................... 152/49 |
| 1,555,479 * | 9/1925 | Morand ................................. 152/49 |
| 1,556,156 * | 10/1925 | Nierman ............................... 152/50 |
| 1,575,910 * | 3/1926 | Goersch .............................. 152/323 |
| 1,882,498 * | 10/1932 | Jarvis ................................. 152/323 |
| 2,920,673 | 1/1960 | Boldt et al. ........................... 152/47 |
| 4,095,637 | 6/1978 | Krishnan ............................. 152/323 |
| 4,164,251 | 8/1979 | Chung ................................. 152/323 |

FOREIGN PATENT DOCUMENTS

| | | | |
|---|---|---|---|
| 8906862 | 9/1989 | (DE) | ............................. B60B/21/02 |
| 342844 | 9/1904 | (FR) | ............................. B60C/7/28 |
| 359566 * | 1/1906 | (GB) | ..................................... 152/40 |
| 5817 * | 3/1911 | (GB) | ..................................... 152/47 |
| 16939 | 7/1913 | (GB) . | |

* cited by examiner

*Primary Examiner*—S. Joseph Morano
*Assistant Examiner*—Jason R. Bellinger
(74) *Attorney, Agent, or Firm*—The Goodyear Tire and Rubber Company; Roger D. Emerson

(57) ABSTRACT

A non-pneumatic tire assembly includes a tread, a tire fill medium which may be urethane, and a metal membrane which separates the tread from the tire fill medium. The tread, tire fill medium, and metal membrane are secured to a rim with two notches. The rim has one notch for holding the tread and a second notch for holding the tire fill medium and the metal membrane. If a different tread is required, the one positioned on the rim is easily removed and a different tread is placed on the double notched rim.

16 Claims, 6 Drawing Sheets

| COMPOUND | MODULUS @ 100% E |
|---|---|
| GB126 | 820 |
| GB018 | 814 |
| TA61H | 634 |
| GB135 | 2326 |
| TA076 | 812 |
| GB278 | 812 |

FIG-3

| ARNCO | TYPE ISO | MODULUS @ 100% E | TENSILE STRENGTH | ELONGATION |
|---|---|---|---|---|
| WINGFIL R | TDI | 70 | 123 | 297 |
| WINGFIL S | TDI | 29 | 69 | 312 |
| WINGFIL H | TDI | 94 | 147 | 215 |
| PERMACOR | TDI | 63 | 120 | 305 |
| MDI REPNEU | MDI | 49 | 53 | 107 |

| SYNAIR | TYPE | MODULUS @ 100% E | TENSILE STRENGTH | ELONGATION |
|---|---|---|---|---|
| TYRFIL GS | TDI | 25 | 74 | 679 |
| TYRFIL LP | TDI | 15 | 67 | 697 |
| ISOFIL | MDI | 32 | 60 | 281 |

FIG-4

NON-PNEUMATIC TIRE WITH DOUBLE NOTCHED RIM

TECHNICAL FIELD

This invention pertains to the art of methods and apparatuses for wheels and tires, and more specifically to methods and apparatuses for non-pneumatic wheels and tires used in off-the-road applications.

BACKGROUND ART

Many types of non-pneumatic tires have been disclosed in the art for use in off-the-road applications. It is often required to change such tires. The reasons for changing tires may include the need for tires with different ride, handling or wear characteristics. Another reason for changing a tire may be that its tread has worn out.

Current methods for changing tires in the field have disadvantages. One method requires that the tire/rim combination on the associated vehicle be removed. Then, the tire is taken off the rim. A different tire is then positioned on the rim so that the new tire/rim combination can be remounted on the associated vehicle. Another common method is to transport different tires already mounted on rims to the field site. Though this method simplifies the field assembly work, it requires that more rims, with tires already mounted on them, be transported to the field site. All such methods are difficult and cumbersome.

The present invention provides methods and apparatuses for overcoming the disadvantages mentioned above. Thus, the difficulties inherent in the prior art are overcome in a way which is simple and efficient, while providing better and more advantageous results.

DISCLOSURE OF INVENTION

In accordance with one aspect of the invention there is provided a non-pneumatic tire assembly which includes a tread and a tire fill medium which may be urethane, rubber, or some other suitable material. A metal membrane separates the tread from the tire fill medium. The tread, tire fill medium, and metal membrane are positioned on a double notched rim. The rim has a first notch for holding the tread and a second notch for holding the tire fill medium and the metal membrane. If a different tread is required, the tread on the rim is removed and a different tread is placed on the rim.

In accordance with another aspect of the invention there is provided a double notched rim for use in supporting a tire assembly. The double notched rim has a first notch for holding a tread and a second notch for holding both a tire fill medium and a metal membrane. A split ring secures the tread, tire fill medium, and metal membrane to the double notched rim.

In accordance with another aspect of the invention there is provided a method for constructing a non-pneumatic tire assembly. A metal membrane is positioned in a notch on a first side of a double notched rim. The second side of the double notched rim is then placed onto the metal membrane and a split ring, which secures the assembly, is mounted. Next, a flowable curable material is injected through an injection valve, becoming a tire fill medium when it cures. The split ring and the second side of the double notched rim are then removed. A tread is then positioned in the second notch of the double notched rim. Finally, the second side of the double notched rim and the split ring are reconnected.

In accordance with another aspect of the invention there is provided a method for re-treading a non-pneumatic tire assembly. A split ring is removed and a second side of a double notched rim is detached. The tread is then removed and a different tread is positioned in its place. The second side of the double notched rim is re-attached and finally the split ring is remounted.

One advantage of the present invention is that in-the-field tire changing difficulties are reduced. There is no need to take a tire off of its rim or to transport additional rim/tire combinations to the field site.

Another advantage of the invention is the ease of changing treads. If a tire requires different tread characteristics or if the tread is worn out, the sectional design of the invention allows one tread to be replaced by another tread.

Still another advantage of the invention is the variety of tire characteristics that can be constructed. By combining different treads with different tire fill mediums a wide range of spring rates, rolling resistances, and handling distinctives are possible.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein:

FIG. 3 is a table of commercial tread compounds and their respective moduli @ 100% E;

FIG. 4 is a table of commercial urethane tire fill compounds and some of their characteristics.

DETAILED DESCRIPTION OF THE INVENTION

Figure 1:
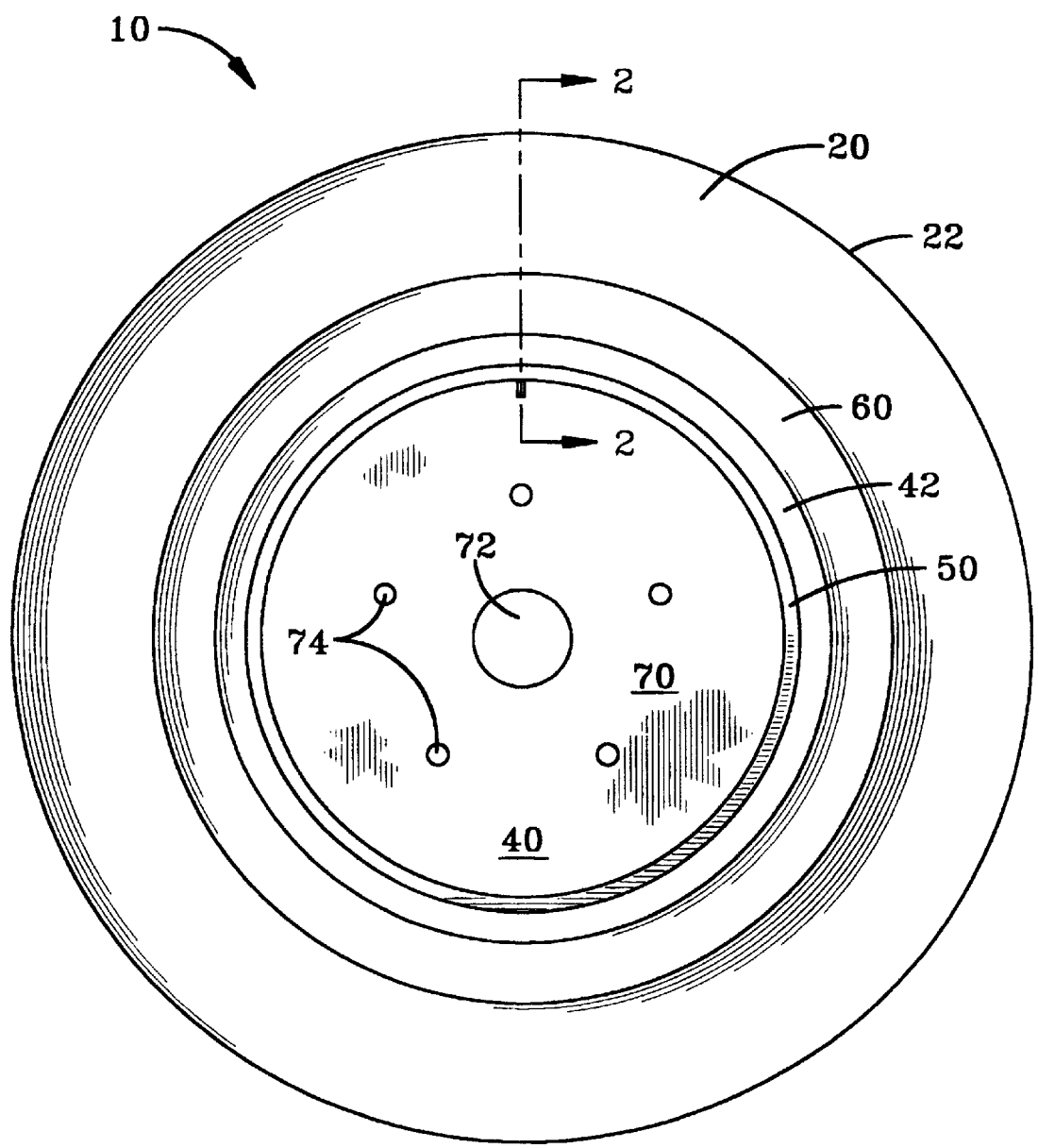
FIG. 1 is a side view of a non-pneumatic tire assembly of the present invention.
Figure 2:
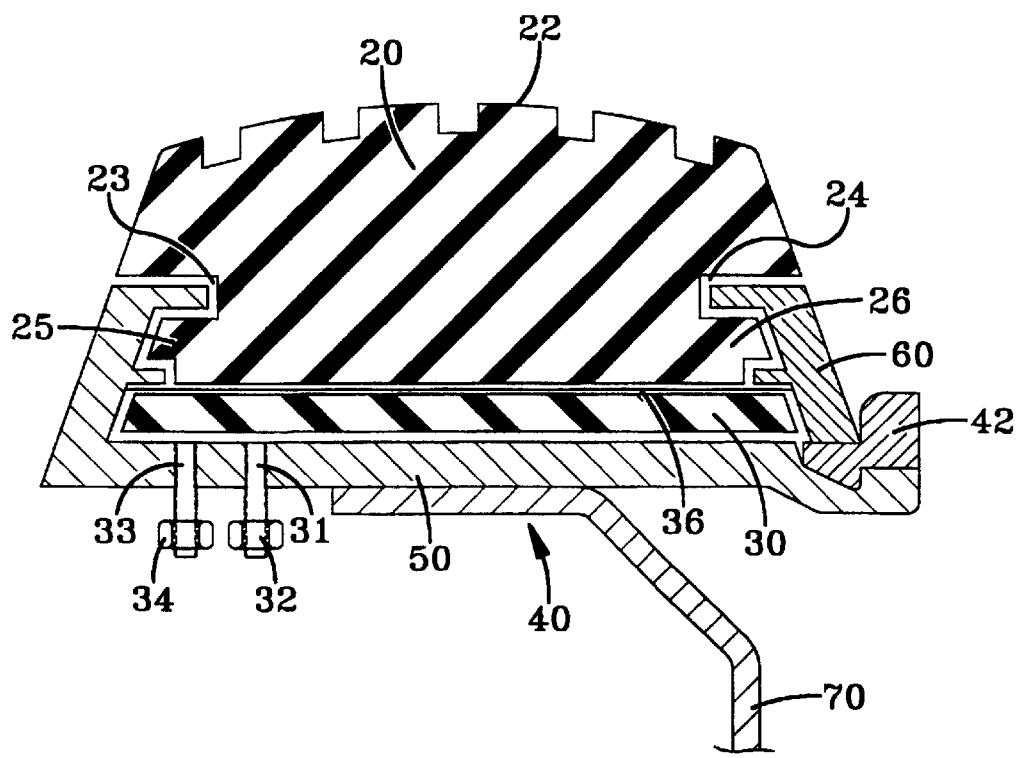
FIG. 2 is a cross-sectional view of one-half a non-pneumatic tire assembly of the present invention taken along the lines 1—1 of FIG. 1.

Referring now to the drawings wherein the showings are for purposes of illustrating a preferred embodiment of the invention only and not for purposes of limiting the same, FIGS. 1 and 2 show a non-pneumatic tire assembly 10. The embodiment illustrated is a size 10.00–20 truck tire assembly but the invention is applicable to passenger cars, off-the-road vehicles, and other applications as well.

The non-pneumatic tire assembly 10 includes a tread 20 a tire fill medium 30 and a double notched rim 40. The tread 20 has a ground surface 22 for contacting the ground or an associated roadway (not shown). The tread 20 is made with two tread slots 23 and 24 and with two tread projections 25 and 26. The tread slots 23, 24 and tread projections 25, 26 attach the tread 20 to the double notched rim 40. FIG. 3 shows a table of commercial tread compounds and their respective moduli @ 100% E. Any of these commercial tread compounds may be used in this embodiment, though other tread compounds may also be used.

With reference to FIG. 2, a tire fill medium 30 is formed of urethane; however, it may also be formed of other materials. FIG. 4 shows a table of commercial urethane tire fill compounds and some of their characteristics. Any of these commercial urethane compounds may be used in this embodiment, though other tire fill medium materials may also be used. Referring again to FIG. 2, valve stem 31 has an injection valve 32. The injection valve 32 can be of any type known in the art. Injection valve 32 is opened so that urethane can be injected through valve stem 31. Valve stem 33 has a pressure valve 34. The pressure valve 34 can be of any type known in the art. A pressure sensor (not shown) is attached to valve stem 33 and pressure valve 34 is opened so that the pressure of the tire fill medium 30 can be sensed. The pressure of the tire fill medium is used to determine when a sufficient amount of urethane or other material has been injected. A membrane 36 is placed between the tire fill medium 30 and the tread 20 forming a boundary for the tire fill medium 30 as it is injected. The membrane 36 also prevents unwanted bonding between the tire fill medium 30 and the tread 20. In this embodiment the membrane 36 is made of metal but other materials may also be used.

Figure 5:
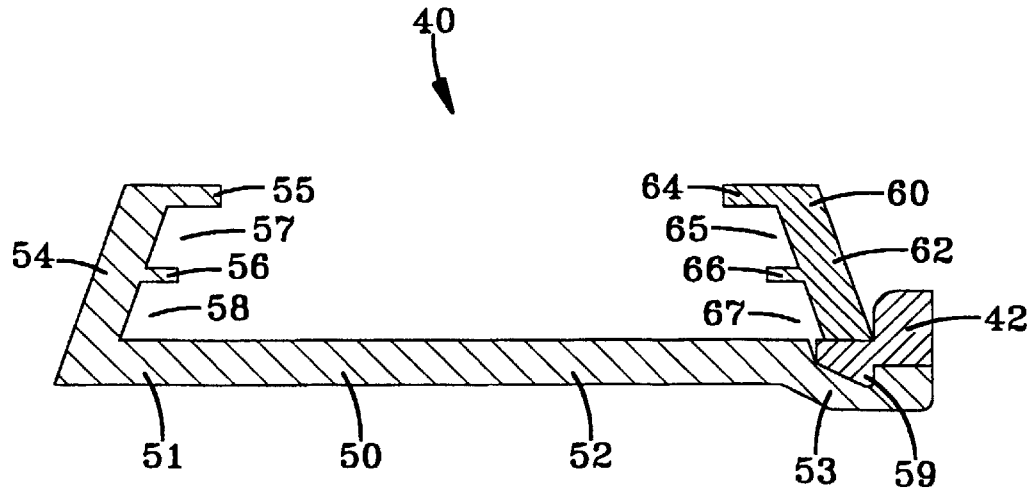
FIG. 5 is an enlarged, cross-sectional view like FIG. 2 showing the notches of the double notched rim.

With reference to FIGS. 1, 2, and 5, the double notched rim 40 has a first rim member 50, a second rim member 60, a split ring 42, and a connection disc 70. As shown in FIG. 1, the connection disc 70 has a large opening 72 and a plurality of holes 74 for attaching the non-pneumatic tire assembly 10 to an associated vehicle (not shown).

Referring to FIG. 5, the first rim member 50 has a support base 52 having a first end 51 and a second end 53. Extending from the first end 51 of the support base 52 is a notch column 54 which has a first arm 55 and a second arm 56. The first arm 55, notch column 54, and second arm 56 combine to form first notch 57. The second arm 56, notch column 54, and support base 52 combine to form second notch 58. The second rim member 60 has a notch column 62 with a first arm 64 and a second arm 66. The first arm 64, notch column 62, and second arm 66 combine to form first notch 65. The second arm 66, notch column 62, and support base 52 of the first rim member 50 combine to form second notch 67.

Figure 6:
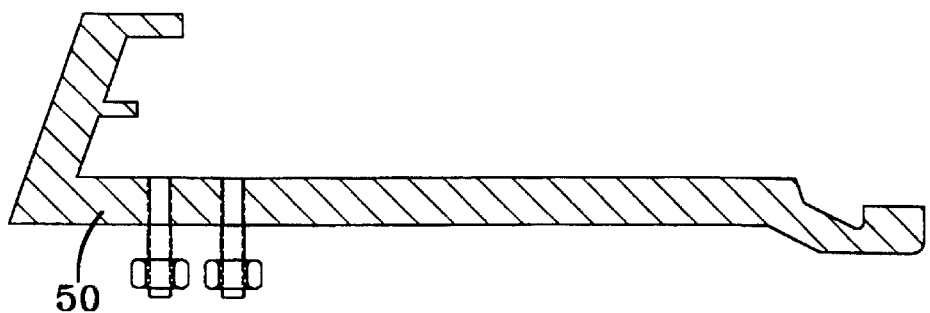
FIG. 6 is a cross-sectional view like FIG. 2 showing the first rim member.
Figure 7:
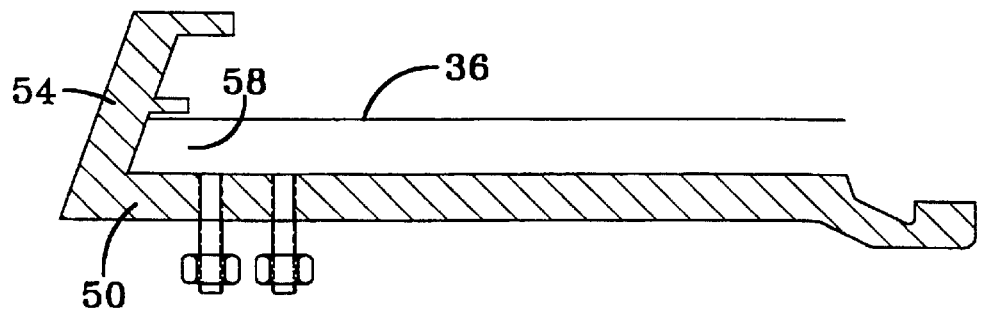
FIG. 7 is a cross-sectional view like FIG. 6 showing the metal membrane positioned in the second notch of the first rim member.
Figure 8:
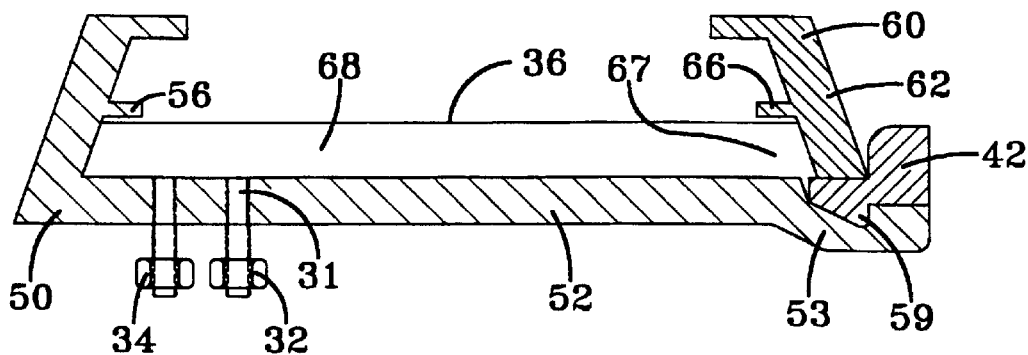
FIG. 8 is a cross-sectional view like FIG. 7 showing the metal membrane positioned in the second notches of the first and second rim members.

One method of constructing a non-pneumatic tire assembly is illustrated in FIG. 6 and utilizes a first rim member 50. A connection disc (not shown) is connected to the first rim member 70 in FIGS. 1 and 2, but it is not shown in the following figures to help clarify and simplified the discussion. As shown in FIG. 7, a membrane 36 made of metal is positioned into the second notch 58 of notch column 54. As shown in FIG. 8, second rim member 60 is placed such that membrane 36 is positioned into the second notch 67 of notch column 62. Next, a split ring 42 is secured to the second end 53 of support base 52 using split ring groove 59. This construction creates notch cavity 68. Injection valve 32 is opened and a flowable curable material is injected through valve stem 31, filling notch cavity 68. As the flowable curable material is injected, membrane 36 is forced against second arm 56 and second arm 66 creating a sealing boundary for the flowable curable material. Pressure valve 34 is used in determining that the proper amount of flowable curable material has been injected. The flowable curable material cures inside notch cavity 68 becoming the tire fill medium 30 shown in FIGS. 2 and 9.

Figure 9:
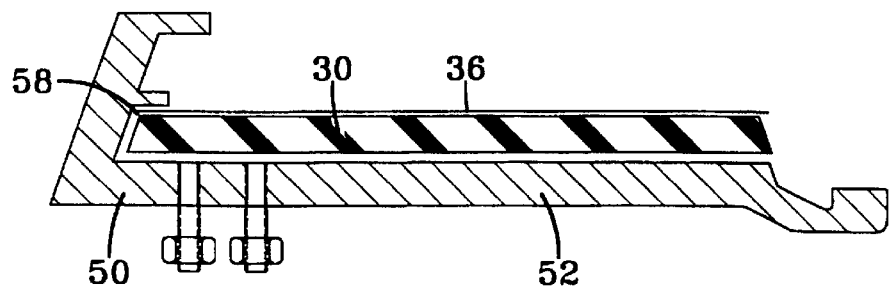
FIG. 9 is a cross-sectional view like FIG. 8 showing the metal membrane and the tire fill medium positioned in the second notch of the first rim member.
Figure 10:
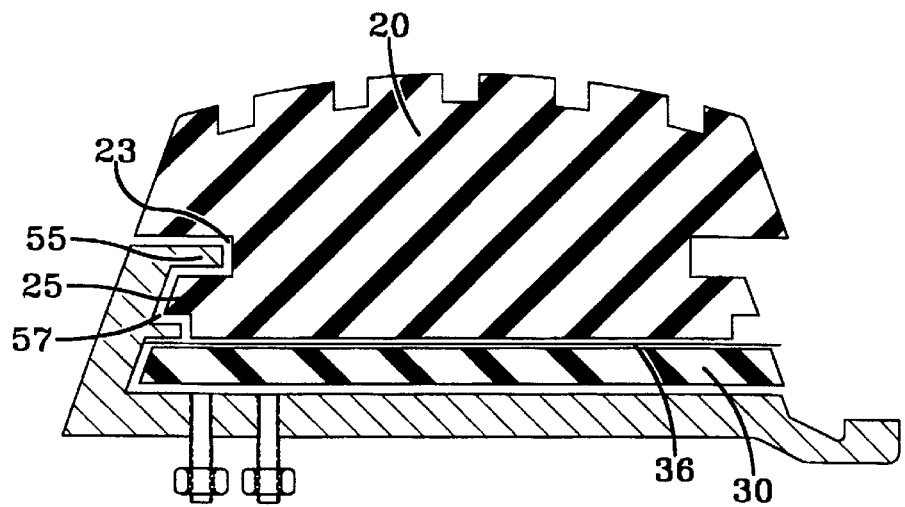
FIG. 10 is a cross-sectional view like FIG. 9 showing the metal membrane, the tire fill medium, and the tread positioned on the first rim member.
Figure 11:
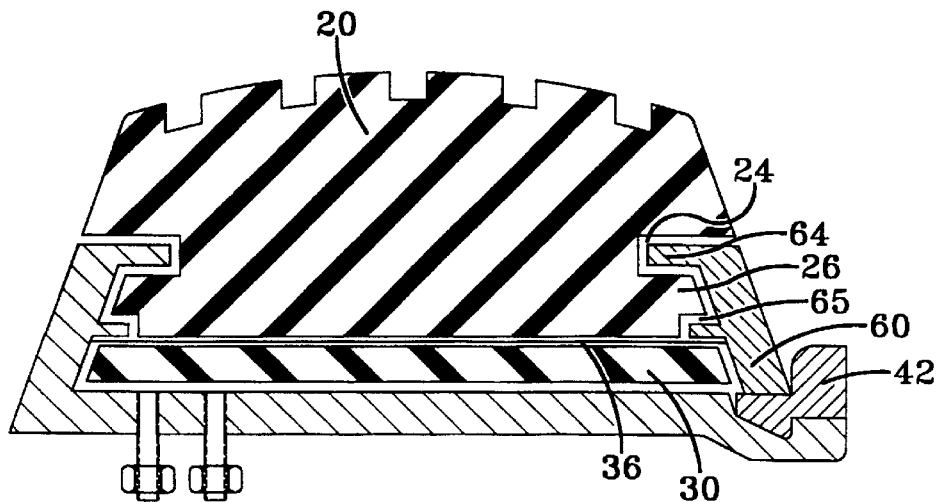
FIG. 11 is a cross-sectional view like FIG. 10 showing the metal membrane, the tire fill medium, and the tread positioned between the first and second rim members; and, FIG. 12 is a cross-sectional view like FIG. 6 showing the first rim member.

FIG. 9 shows the tire fill medium 30 and the membrane 36 positioned on the support base 52 of first rim member 50 within second notch 58. The second rim member 60 and split ring 42, shown in FIG. 8, have been removed. Next, as shown in FIG. 10, a tread 20 is positioned such that tread slot 23 receives first arm 55 and first notch 57 receives tread projection 25. Referring now to FIG. 11, second rim member 60 is placed onto tread 20 such that tread slot 24 receives first arm 64 and first notch 65 receives tread projection 26. Then the split ring 42 is mounted.

Figure 12:
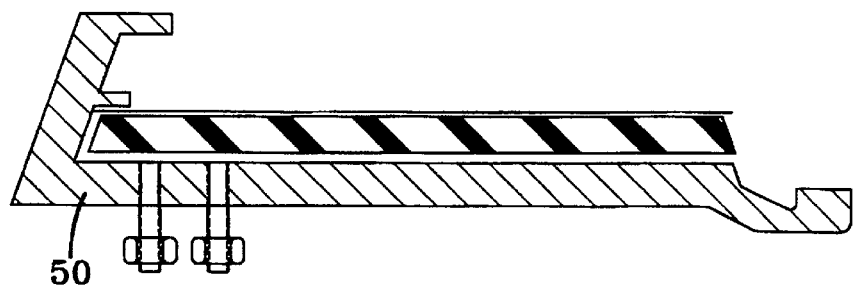
Figure 13:
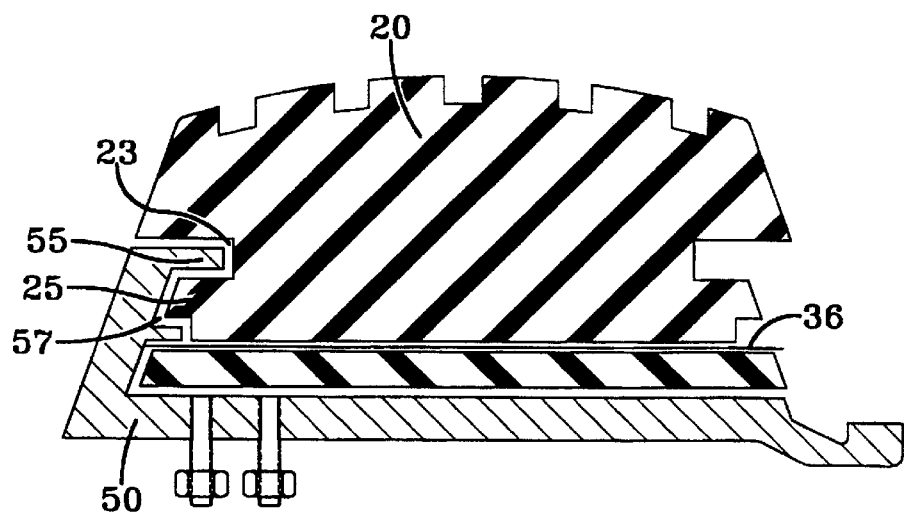
FIG. 13 is a cross-sectional view showing the membrane and the tread positioned on the first rim member prior to the addition of the tire fill medium; and, FIG. 14 is a cross-sectional view like FIG. 11 showing the membrane, the tire fill medium, and the tread positioned between the first and second rim members.

For another method of constructing a non-pneumatic tire assembly, FIG. 12 shows a first rim member 50. As shown in FIG. 13, a tread 20 is positioned such that tread slot 23 receives first arm 55 and first notch 57 receives tread projection 25. Next, a membrane 36 is positioned into the second notch 58 of notch column 54. For this embodiment, the membrane 36 is made of metal however, it may also be formed of another material. It is also possible, depending on the material to be used for the tire fill medium, to refrain from using a membrane.

Figure 14:
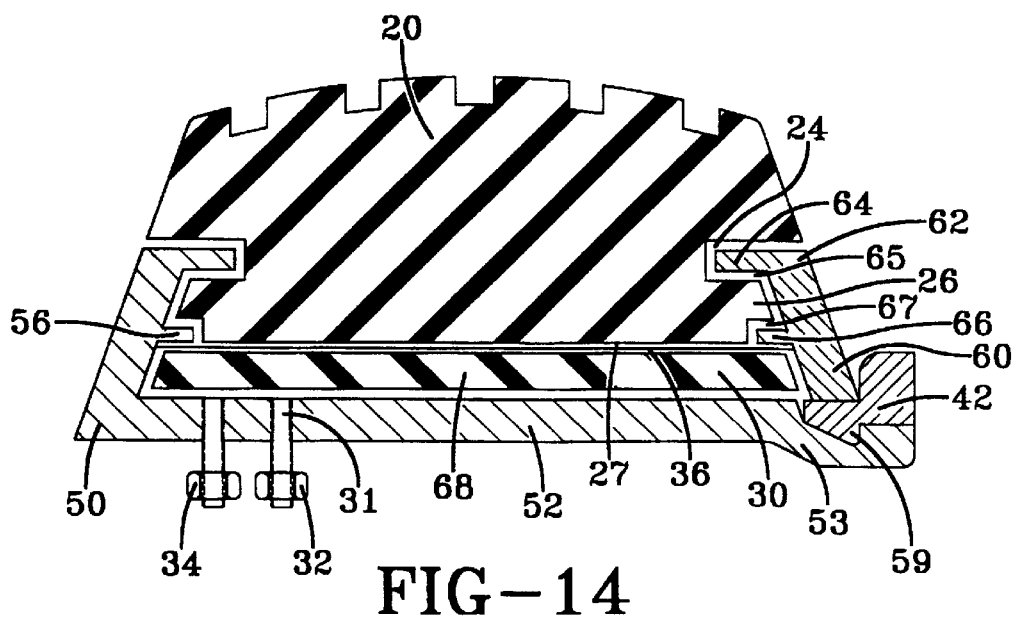

As shown in FIG. 14, second rim member 60 is placed such that membrane 36 is positioned into the second notch 67 of notch column 62 and such that tread slot 24 receives first arm 64 and first notch 65 receives tread projection 26. Next, a split ring 42 is secured to the second end 53 of support base 52 using split ring groove 59. This construction creates notch cavity 68. Injection valve 32 is opened and a flowable curable material is injected through valve stem 31, filling notch cavity 68. As the flowable curable material is injected, membrane 36 is forced against second arm 56, first side 27 of the tread 20, and second arm 66 creating a sealing boundary for the flowable curable material. If a membrane is not used, second arm 56, first side 27 of the tread 20, and second arm 66 form a sealing boundary for the flowable curable material. Pressure valve 34 is used in determining that the proper amount of flowable curable material has been injected. The flowable curable material cures inside notch cavity 68 becoming the tire fill medium 30.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A rim assembly (40) adapted for use in supporting an associated tire fill medium (30) and an associated tread (20) in a non-pneumatic tire assembly (10), wherein said tread has a ground engaging surface (22) extending between spaced first and second sides, and wherein said tire fill medium is radially inward of said tread and has spaced first and second sides, said rim assembly being characterized by:

a first rim member (50) having a transversely extending support base (52) including spaced first and second ends (51, 53) and a notch column (54) radially extending from said first end (51) of said support base, said notch column having a first notch (57) adapted to hold said first side of said associated tread and a second notch (58) adapted to hold said first side of said associated tire fill medium;

a second rim member (60) having a second notch column (62), said second notch column having a first notch (65) adapted to hold said second side of said associated tread and a second notch (67) adapted to hold said second side of said associated tire fill medium;

securing means for selectively securing said second rim member in predetermined relationship to said first rim member, said securing means selectively extending between said second rim member and said second end (53) of said support base of said first rim member; and, connecting means extending from a radially inward surface of said support base, said connecting means being adapted to connect said first rim member to an associated vehicle.

2. The rim assembly of claim 1 wherein said support base has a groove (59) at said second end and wherein said securing means is a split ring (42), said split ring being received in said groove.

3. The rim assembly of claim 1 wherein said connecting means is a connection disc (70) having a plurality of holes (72) therein.

4. The rim assembly of claim 1 wherein the non-pneumatic tire assembly further includes a metal membrane (36) positioned between the tread and said tire fill medium.

5. The rim assembly of claim 1 further characterized in that said first rim member includes an injection valve (32) for injecting said tire fill medium.

6. A non-pneumatic tire and rim assembly (10) including a tread (20) having a ground engaging surface (22) extending between spaced first and second sides, a tire fill medium (30) having spaced first and second sides, and a rim assembly (40), said tread and said fill material being supported by said rim assembly, the tire assembly characterized by:

said first side of said tread having a first tread projection (25) and said second side of said tread having a second tread projection (26); and, said rim assembly including a first rim member (50) having a transversely extending support base (52) including spaced first and second ends (51, 53) and a notch column (54) radially extending from said first end (51) of said support base, said notch column having a first notch (57) and a second notch (58) therein, said first tread projection being received in said first notch (57) and said first side of said tire fill medium being received in said second notch (58), a second rim member (60) having a second notch column (62), said second notch column having a first notch (65) and a second notch (67) therein, said second tread projection being received in said first notch (65) and said second side of said tire fill medium being received in said second notch (67), securing means for selectively securing said second rim member in predetermined relationship to said first rim member, said securing means selectively extending between said second rim member and said second end (53) of said support base of said first rim member, and connecting means extending from a radially inward surface of said support base, said connecting means being adapted to connect said first rim member to an associated vehicle.

7. The non-pneumatic tire and rim assembly of claim 6 further characterized by:

a membrane (36) positioned between said tread and said tire fill medium.

8. The non-pneumatic tire and rim assembly of claim 7 wherein said membrane is made of metal.

9. The non-pneumatic tire and rim assembly of claim 6 wherein said tread is selectively replaceable with a second associated tread.

10. The non-pneumatic tire and rim assembly of claim 6 further characterized by:

said tire fill medium being a flowable curable material; and, said first rim member including an injection valve (32) for injecting said tire fill medium and a pressure valve (34) for measuring a pressure of said tire fill medium.

11. A method for constructing a non-pneumatic tire assembly (10) including a tread (20) having a ground engaging surface (22) extending between spaced first and second sides, a tire fill medium (30) having spaced first and second sides, and a rim (40), said tread and said fill material being supported by said rim, the method characterized by the steps of:

providing said first side of said tread with a first tread projection (25) and said second side of said tread with a second tread projection (26);

providing a first rim member (50) having a support base (52) and a notch column (54) radially extending from a first end (51) of said support base, said notch column having a first notch (57) and a second notch (58) therein;

providing a second rim member (60) having a second notch column (62), said second notch column having a first notch (65) and a second notch (67) therein;

providing securing means for securing said first side of said tread and said first side of said tire fill medium to said first rim member and said second side of said tread and said second side of said tire fill medium to said second rim member;

providing connecting means for connecting said first rim member to an associated vehicle;

providing said first rim member with an injection valve (32);

positioning said first tread projection into said first notch of said first rim member;

positioning said second tread projection into said first notch of said second notch column;

engaging said securing means after said steps of positioning said first and second tread projections to create a notch cavity (68) between said tread and said support base; and, injecting a flowable material into said notch cavity through said injection valve.

12. The method of claim 11 further characterized by the step of:

inserting a membrane (36) into said second notch of said first rim member and said second notch of said second rim member before said step of engaging said securing means.

13. The method of claim 12 wherein said flowable material is curable, the method further comprising the step of:

allowing said flowable material to cure.

14. A method for re-treading a non-pneumatic tire and rim assembly (10) with a second associated tread, the non-pneumatic tire assembly including a first tread (20) having a ground engaging surface (22) extending between spaced first and second sides, a tire fill medium (30) having spaced first and second sides, and a rim assembly (40), said tread and said fill material being supported by said rim assembly, the method characterized by the steps of:

provide said first side of said tread with a first tread projection (25) and said second side of said tread with a second tread projection (26);

providing said rim assembly with a first rim member (50) having a transversely extending support base (52) having first and second spaced ends (51, 53) and a notch column (54) radially extending from said first end (51) of said support base, said notch column having a first notch (57) and a second notch (58) therein; a second rim member (60) having a second notch column (62), said second notch column having a first notch (65) and a second notch (67) therein; and securing means for selectively securing said second rim member in a predetermined relationship to said first rim member, said securing means selectively extending between said second rim member and said second end (53) of said support base of said first rim member wherein said first tread projection (25) is received in said first notch (57) of said first rim member and said second tread projection (26) is received in said first notch (65) of said second rim member;

removing said securing means from between said second rim member and said first rim member;

detaching said second rim member from said first tread after said step of removing said securing means;

removing said first tread from said first rim member;

positioning said associated second tread into said first notch of said first rim member;

placing said second rim member onto said associated second tread, said tread being positioned into said first notch of said second rim; and, replacing said securing means.

15. The method of claim 14 wherein the non-pneumatic tire assembly also includes a metal membrane fitting in said second notch of said first rim member and said second notch of said second rim member.

16. A method for constructing a non-pneumatic tire and rim assembly (10) including a tread (20) having a ground engaging surface (22) extending between spaced first and second sides, a tire fill medium (30) having spaced first and second sides, and a rim (40), said tread and said fill material being supported by said rim, the method characterized by the steps of:

providing a first rim member (50) having a transversely extending support base (52) having first and second spaced ends (51, 53) and a notch column (54) radially extending from said first end (51) of said support base, said notch column having a first notch (57) and a second notch (58) therein;

providing a second rim member (60) having a second notch column (62), said second notch column having a first notch (65) and a second notch (67) therein;

providing said first rim member with an injection valve (32);

inserting a membrane (36) into said second notch of said first rim member;

placing said second rim member onto said membrane, said membrane being positioned into said second notch of said second rim member;

providing a split ring (42) to hold said first rim member, said second rim member and said membrane in a predetermined relative position;

positioning said split ring to extend between said second rim member and said second end of said support base of said first rim member;

injecting a flowable curable material through said injection valve after said split ring is positioned;

allowing said flowable material to cure;

removing said split ring after said flowable material is cured;

providing said first side of said tread with a first tread projection (25) and said second side of said tread with a second tread projection (26);

positioning said first tread projection into said first notch of said first rim member after said split ring is removed;

positioning said second tread projection into said first notch of said second notch column after said split ring is removed; and, re-mounting said split ring.

* * * * *